United States Patent [19]

Fields

[11] Patent Number: 4,457,330
[45] Date of Patent: Jul. 3, 1984

[54] REVERSIBLE QUICK EXHAUST VALVE
[75] Inventor: Larry D. Fields, Mira Loma, Calif.
[73] Assignee: Yardney Corporation, Pawcatuck, Conn.
[21] Appl. No.: 465,736
[22] Filed: Feb. 11, 1983
[51] Int. Cl.³ .............................. G05D 7/00
[52] U.S. Cl. ........................ 137/102; 137/107
[58] Field of Search ............. 137/102, 103, 107; 91/442

[56] References Cited

U.S. PATENT DOCUMENTS 3,419,031 12/1968 Hesse et al. ................. 137/102

FOREIGN PATENT DOCUMENTS 2062116 7/1978 Fed. Rep. of Germany ...... 137/102

Primary Examiner—Martin P. Schwadron
Assistant Examiner—Stephen M. Hepperle
Attorney, Agent, or Firm—Donald E. Nist

[57] ABSTRACT

An improved reversible quick exhaust valve is provided which comprises, in combination, a valve housing and a flexible resilient valve member disposed in the housing. The housing has a hollow interior and defines and entry port and first and second exit ports. A valve support is positioned in the interior to define with the housing a narrow passageway between the inlet port and the first exit port. The valve member is in the form of a flexible plate having a depending wall. The plate is disposed over one end of the valve support and the depending wall extends into the passageway. The plate blocks passage of liquid from the inlet port to the second exit port. The depending wall flexes during passage of the liquid from the inlet port into the housing and through the passageway to permit the liquid to pass out of the housing through the first exit port. When liquid is passed into the housing from the first exit port, the valve member is displaced sufficiently to permit the liquid to pass out of the housing through the second exit port but seals the first exit port from the inlet port. The valve is simple, efficient and utilizable in a liquid treating system such as filtration systems for agricultural and industrial water and the like.

2 Claims, 4 Drawing Figures

REVERSIBLE QUICK EXHAUST VALVE

BACKGROUND OF THE INVENTION

1. Field of the Invention

The present invention generally relates to valves and more particularly to an improved type of reversible quick exhaust valve. 2. Prior Art During the filtration of agricultural and industrial waters, it is frequently necessary to back flush the system to strip the filters of accumulated debris and generally to purge the various lines in the system. Various types of valves have been used to control the flow of liquids such as water through the various lines of filtration systems, both for the primary filtration steps and for back flushing and purging. Difficulties have been encountered in providing a compact valve which will permit the rapid flow of liquid therethrough in the back flushing mode and shunt that liquid to an exhaust line without plugging and without causing the back flushed liquid to enter the primary liquid supply line. Most such valves are either expensive and cumbersome or are inefficient or both.

Accordingly, there is a need for an inexpensive, readily replaceable valve which can quickly exhaust back flushed liquids without causing the liquids to enter the primary supply line of a filtration system. Such a valve should be capable of easy inspection, easy replacement of components and positive shunting without plugging.

SUMMARY OF THE INVENTION

The improved reversible quick exhaust valve of the present invention satisfies all of the foregoing needs. The valve is substantially as set forth in the Abstract above. Thus, the valve comprises a valve housing containing a flexible resilient valve member. The housing has a hollow interior, an entry port, a first exit port and a second exit port. A valve support is positioned in the interior to define with the housing a narrow preferably annular passageway between the entry port and the first exit port. The valve member comprises a flexible plate having a depending preferably annular wall. The plate is disposed over one end of the valve support and blocks passage of water or other liquid from the entry port to the second exit port. The valve support is in line with the second exit port and preferably so also is the entry port. The depending wall extends into the passageway to block that passageway while the valve member is in the resting position. However, when liquid flows into the housing through the entry port, the wall flexes to permit that liquid to flow out of the housing through the first exit port. During back flushing of liquid through the valve, liquid flows from the first exit port into the passageway and causes displacement of the valve member to a sufficient extent to permit the liquid to flow to the second exit port while blocking its flow to the entry port.

The valve member is preferably cup-shaped and the entry and second exit ports are preferably vertically disposed in line with each other while the first exit port is preferably about horizontal. In order to facilitate sealing of the entry port from back flowing liquid, the valve member preferably has the depending wall spaced inwardly from the outer periphery of the plate so that that outer periphery can readily reflex. Moreover, the housing in the portion adjacent that outer periphery preferably is sloped towards that outer periphery so that only a small displacement of the valve member results in effective sealing of the entry port.

Various other features of the present invention are set forth in the following detailed description and accompanying drawings.

DRAWINGS

Figure 1:
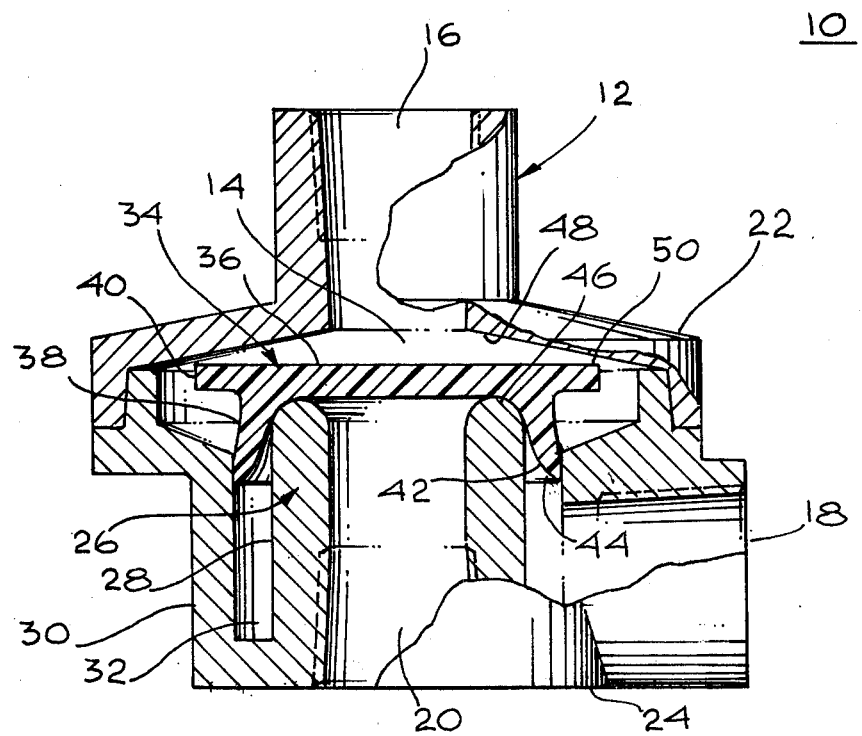
FIG. 1 is a schematic side elevation, partly broken away and partly in section, of a preferred embodiment of the improved reversible quick exhaust valve of the present invention, with the valve member thereof shown in the resting position.
Figure 3:
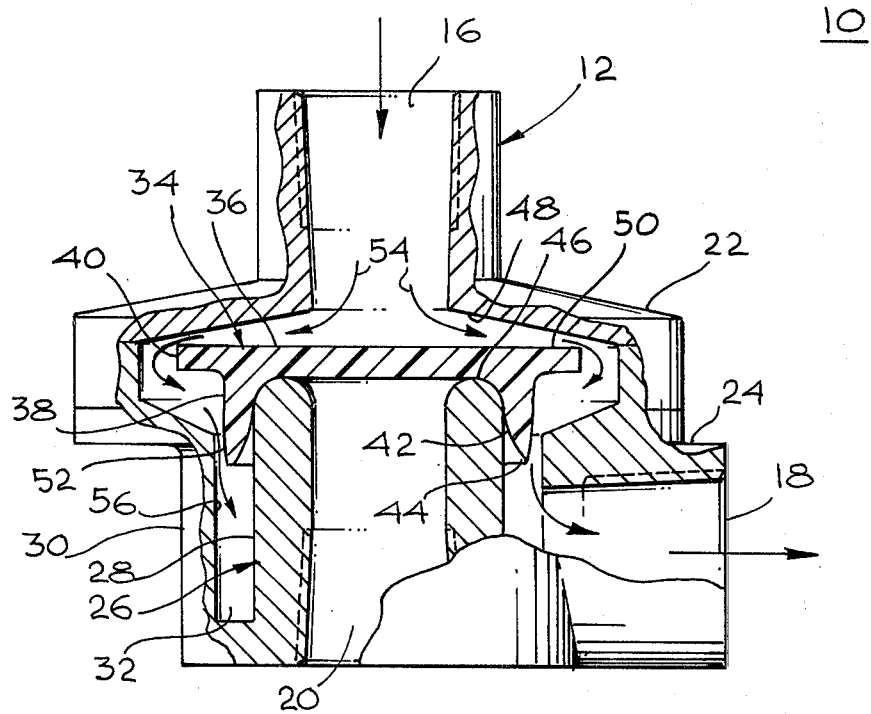
Figure 4:
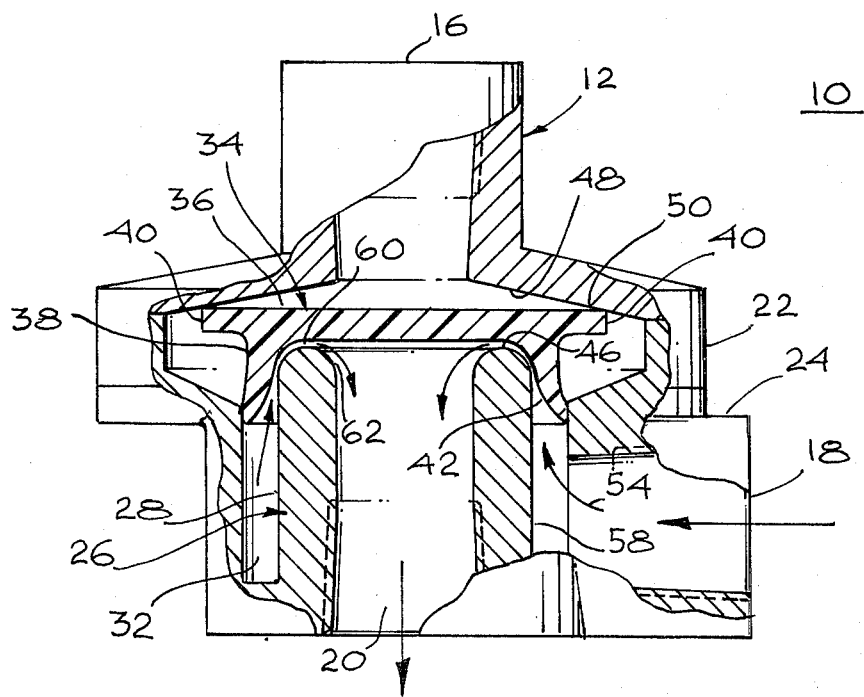

FIG. 3 is a schematic side elevation, partly broken away and partly in section, of the valve of FIG. 1 shown during flow of liquid therethrough from the entry port to the first exit port; and, FIG. 4 is a schematic side elevation, partly broken away and partly in section, of the valve of FIG. 1 shown with the valve member thereof displaced during back flushing through the valve to permit flow of liquid from the first exit port to the second exit port while the entry port is sealed.

DETAILED DESCRIPTION

Figure 2:
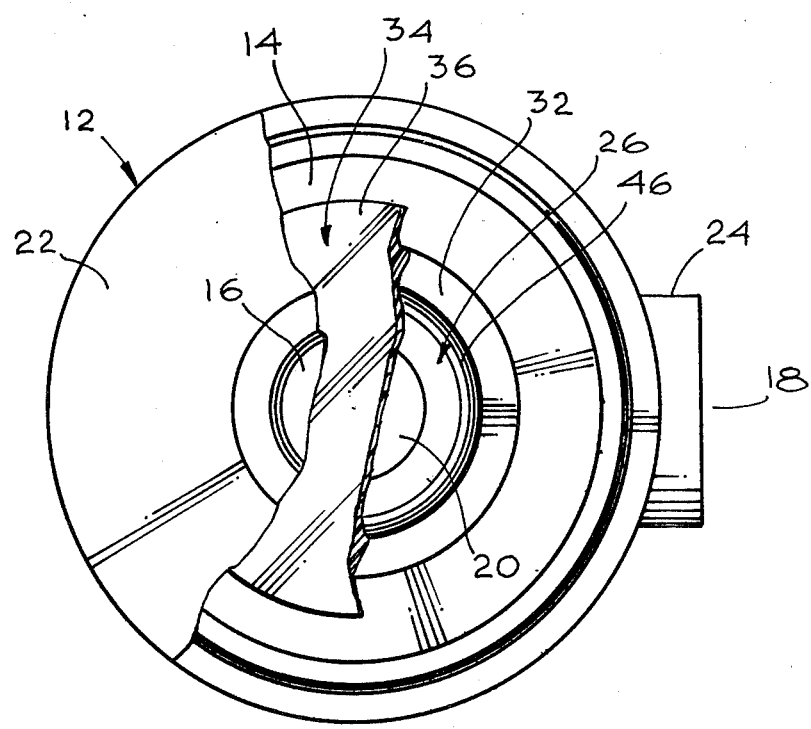
FIG. 2 is a schematic top plan view, partly broken away, of the valve of FIG. 1.

FIGS. 1 and 2

Now referring more particularly to FIGS. 1 and 2 of the accompanying drawings, a preferred embodiment of the improved reversible quick exhaust valve of the present invention is schematically depicted therein. Thus, valve 10 is shown which comprises a housing 12 defining a hollow interior 14, a vertical entry port 16, a horizontal first exit port 18 and a vertical second exit port 20. Housing 12 includes a removable top 22 releasably secured over a bottom 24. Top 22 includes entry port 16 while bottom 24 includes first exit port 18 and second exit port 20.

An integral valve support 26 comprising a vertically disposed hollow tubular member 28 is spaced inwardly from the side wall 30 of bottom 24 and defines therewith an annular passageway 32 in communication with the entry port 16 and first exit port 18. Member 28 extends outwardly from and in part defines second exit port 20. Entry port 16 and exit port 20 are vertically aligned.

Valve 10 also includes a flexible resilient valve member 34 formed of, for example, natural or synthetic rubber or another elastomeric material. Member 34 comprises a generally horizontally extending flat plate 36 which is resilient and flexible and a generally vertical resilient, flexible wall integral therewith and depending therefrom into passageway 32, as shown in FIG. 1. Preferably, wall 38 is disposed inwardly from the outer periphery 40 of plate 36. In the event that passageway 32 is annular, then wall 38 is also annular and preferably plate 36 is circular as shown particularly in FIG. 2. Preferably, the inner face 42 of wall 38 at its lower end 44 is slightly curved and rounded as shown in FIG. 1. It will be noted that member 34 is dimensioned so as to seat snugly over the upper end 46 of support 26 and that the adjoining inner surfaces 48 of top 22 are downwardly and outwardly sloped and closely positioned to the upper surface 50 of periphery 40.

In the resting position, inlet port 16 is totally sealed from both exit port 18 and exit port 20, as shown in FIG. 1.

FIGS. 3 and 4

FIG. 3 shows the position of valve member 34 during flow of liquid into entry port 16 and through housing 12. In this regard, the liquid flow, as indicated by the arrows in FIG. 3 forces the outer face 52 of wall 38 inwardly so that liquid 54 can pass between that outer face 52 and the adjoining face 56 of housing 12 and enter first exit port 18 to pass from housing 12. This flexing of wall 38 occurs during normal flow of liquid through valve 10 as in a filtration process.

FIG. 4 shows the position of valve member 34 when liquid 54 is back flowed into housing 12 through first exit port 18 and passes into annular passageway 32. Such a back flow will normally occur during back flushing of a filtration system in which valve 10 is disposed. When liquid 54 strikes the curved face 42 of wall 38 it is funneled up between that face and the adjoining outer surface 58 of member 28, forcing valve member 34 upwardly so that the top surface 50 of outer periphery 40 of plate 36 tightly abuts surface 48 and seals entry port 16 from passageway of liquid 54 thereto. At the same time, this lifting of valve member 34 upwardly opens a space 60 between plate 36, wall 38 and the upper end 62 of member 28, permitting liquid 54 to flow into second exit port 20 after passing through the interior of member 28. That second exit port 20 can be connected to a waste or exhaust line (not shown) to permit the back flushed liquid to pass from the filtration system.

It will be understood that the particular dimensions of members 28 and 34 and their components as well as the particular configuration of the various surfaces of housing 12 can be adjusted to cause valve 10 to function optimally at a desired flow rate. Typically, valve 10 can be formed of plastic such as polyvinyl chloride, polypropylene or the like, with valve member 34 fabricated of cast natural or synthetic rubber such as neoprene rubber or the like. Valve 10 may, for example, have a diameter of approximately 1⅞" to 2" and a height of approximately 1¾" to 2", with port diameters of, for example, about ½" each. Valve member 34 may for example, have an average diameter of about 1¼", with depending wall 38 having an average depth of about ¼" and an average diameter of about 1⅛". Obviously, larger and smaller valves 10 can be provided with different relative dimensions.

Various other modifications, changes, alterations and additions can be made in the improved valve of the present invention and its components. All such modifications, changes, alterations and additions as are within the scope of the appended claims form part of the present invention.

What is claimed is:

1. An improved, reversible, quick exhaust valve, said valve comprising, in combination:
   a. a valve housing defining a hollow interior, an entry port, a first exit port, a second exit port and a valve support positioned in said interior to define with said housing a narrow annular passageway between said entry port and said first exit port, said valve support extending from said second exit port toward said entry port; and,
   b. a flexible resilient cup-shaped valve member comprising a plate having an annular depending wall spaced inwardly from the outer periphery of said plate, said housing adjacent said plate outer periphery being sloped to facilitate sealing of said entry port during back flow, said entry port and said second exit port being substantially in line with said plate disposed across that line, said valve member being disposed in said interior over said valve support, with said depending wall extending into said passageway, said valve member in the resting position having said plate block said entry port from said second exit port, said depending wall blocking said entry port from both of said exit ports, said depending wall being sufficiently flexible to permit flow of liquid from said entry port only to said first exit port and, during back flowing through said valve, said valve member being displaced by back flow liquid sufficiently to permit flow of that liquid from said first exit port through said passageway to said second exit port but blocking flow of that liquid to said entry port, said plate during said back flow being forced against the adjacent portion of said housing to seal off said entry port.

2. The improved valve of claim 1 wherein said entry port and second exit port are disposed in vertical alignment, wherein said valve support extends vertically in said interior and wherein said first exit port is horizontal.

* * * * *